United States Patent
Nielsen

(10) Patent No.: US 12,127,504 B2
(45) Date of Patent: Oct. 29, 2024

(54) CROP CONVEYOR COUPLING MECHANISM

(71) Applicant: KVERNELAND GROUP KERTEMINDE AS, Kerteminde (DK)

(72) Inventor: Bjarne Nielsen, Ullerslev (DK)

(73) Assignee: KVERNELAND GROUP KERTEMINDE AS, Kerteminde (DK)

( * ) Notice: Subject to any disclaimer, the term of this patent is extended or adjusted under 35 U.S.C. 154(b) by 723 days.

(21) Appl. No.: 17/312,554

(22) PCT Filed: Dec. 12, 2019

(86) PCT No.: PCT/EP2019/084900
§ 371 (c)(1),
(2) Date: Jun. 10, 2021

(87) PCT Pub. No.: WO2020/120680
PCT Pub. Date: Jun. 18, 2020

(65) Prior Publication Data
US 2022/0053701 A1    Feb. 24, 2022

(30) Foreign Application Priority Data
Dec. 14, 2018  (EP) .................................. 18212510

(51) Int. Cl.
*A01D 57/20* (2006.01)
*A01D 61/02* (2006.01)

(52) U.S. Cl.
CPC ............. *A01D 57/20* (2013.01); *A01D 61/02* (2013.01)

(58) Field of Classification Search
CPC ................................ A01D 57/20; A01D 61/02
See application file for complete search history.

(56) References Cited

U.S. PATENT DOCUMENTS 5,031,394 A * 7/1991 Honey ................. A01D 43/077
                                              280/412
5,231,826 A * 8/1993 Jennings ................ A01D 82/00
                                              56/11.4

(Continued)

FOREIGN PATENT DOCUMENTS

| EP | 2789224 A1 | 10/2014 |
| GB | 1206648 A | 9/1970 |
| WO | 9909806 A1 | 3/1999 |

OTHER PUBLICATIONS

International Search Report issued in connection with PCT/EP2019/084900 dated Feb. 14, 2020.

(Continued)

*Primary Examiner* — Abigail A Risic
(74) *Attorney, Agent, or Firm* — Dennemeyer & Associates LLC

(57) ABSTRACT

A coupling mechanism for coupling a crop conveyor unit 15, for creating a swath behind an agricultural machine, to a mounting structure 10 attached to an agricultural operating unit, e.g. a mower 21. The coupling mechanism consists of gendered elements 65/66, at least one of which is tapered, such that the connection is self-guiding into the engaged configuration. A quick coupling method is described where the conveyor unit 15 is rolled on wheels to locate the male element 11 underneath the female element 12. The mounting structure is raised such that the male element engages the female element and optional locking pins secure the engaged parts together. Quick de-coupling is performed by reversal of the coupling method.

16 Claims, 12 Drawing Sheets

(56) References Cited

U.S. PATENT DOCUMENTS

| | | | | |
|---|---|---|---|---|
| 5,930,988 A * | 8/1999 | Hanson | ............... | A01D 82/00 |
| | | | | 56/192 |
| 6,401,440 B1 * | 6/2002 | Franet | ................ | A01D 57/20 |
| | | | | 56/203 |
| 11,528,845 B2 * | 12/2022 | Jespersen | ............ | A01D 34/66 |
| 2005/0172598 A1 * | 8/2005 | Billard | ............. | A01D 57/20 |
| | | | | 56/192 |
| 2007/0068131 A1 * | 3/2007 | Talbot | ............... | A01D 57/20 |
| | | | | 56/192 |
| 2010/0031622 A1 * | 2/2010 | Frey | ................... | A01D 57/20 |
| | | | | 56/366 |
| 2018/0255707 A1 | 9/2018 | Solimar Walter | | |
| 2018/0295778 A1 * | 10/2018 | Kringstad | ........ | B65G 47/766 |

OTHER PUBLICATIONS

European Search Report issued in connection with EP 18212510.4 May 14, 2019.

* cited by examiner

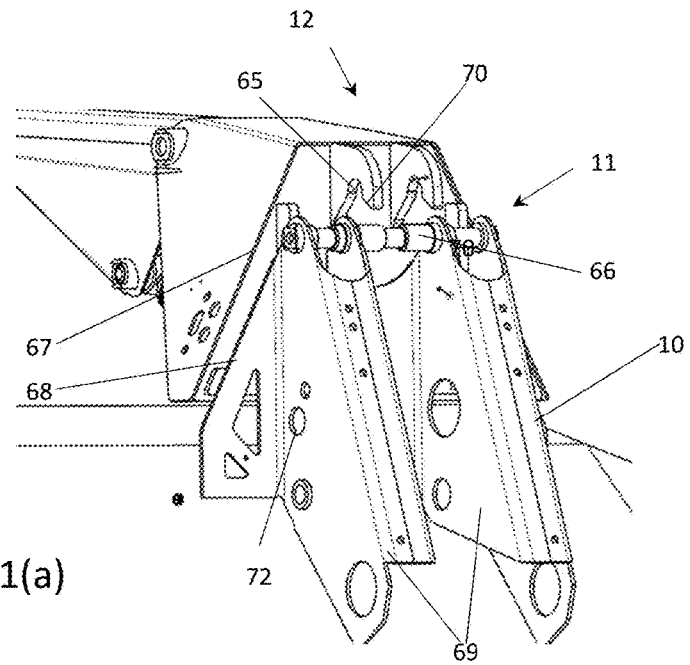
Fig. 11(a)
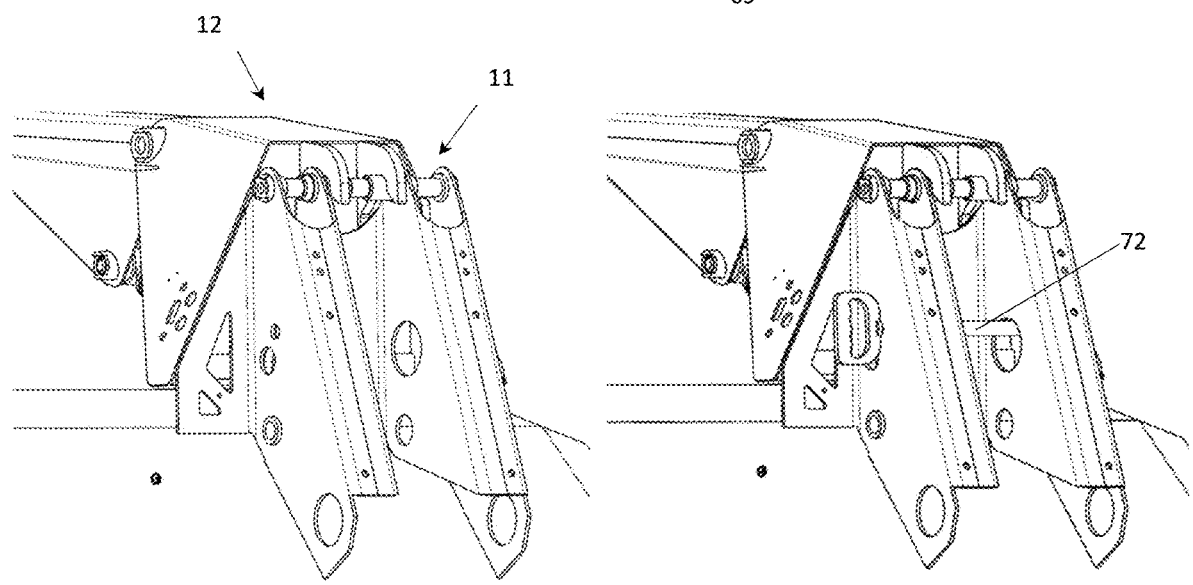
Fig. 11(b)
Fig. 11(c)

CROP CONVEYOR COUPLING MECHANISM

CROSS-REFERENCE TO RELATED APPLICATIONS

This is a 35 U.S.C. 371 National Stage Patent Application of International Application No. PCT/EP2019/084900, filed Dec. 12, 2019, which claims priority to European application 18212510.4, filed Dec. 14, 2018, each of which is hereby incorporated by reference in its entirety.

The present invention relates to a coupling mechanism for a crop conveyor and a method of coupling or decoupling same. In particular the invention relates to a coupling mechanism for a belt-type crop conveyor suitable for attaching to a mower/conditioner suspended from a carrier arm. The coupling mechanism is self-guiding and provided by engageable complementary gendered elements.

BACKGROUND

Crop conveyors, also known as swathing units, coupled to agricultural machines, such as mowers (including mower conditioners and plain mowers without a downstream conditioner unit), are known. Agricultural mowers are used for cutting crops, for example grass, alfalfa or other crops, which can then be collected and baled or chopped ready for use as animal feed, bedding, fuel or for other purposes. Swathing units can be positioned downstream of, for example, a mower and/or conditioner in order to guide the cut crop into a narrow swath across the field so that it can be easily collected, baled or chopped by a subsequent pass with another agricultural machine. There are two main types of swathing unit; belt conveyors (e.g. EP1389413) and augers (e.g. U.S. Pat. No. 6,508,050). A belt conveyor features a continuous belt upon rollers moving in a desired direction, assisted by ribs on the belt surface, to ensure continual movement of the cut material. An auger conveyor features a screw arrangement that moves material axially as it turns, again ensuring continual movement of cut material. However, a swathing unit is not always required as sometimes the crop is to be spread widely for more rapid drying (such as described by EP2829168).

It is common for an agricultural mower to include a mower unit having a set of rotating cutter drums or cutter discs that cut the standing crop, and a swathing unit that forms the cut crop into a swath that is deposited on the ground, so that it can subsequently be collected. The swathing unit is often an integral part of the agricultural mower, together with the mower unit, although it may alternatively be a separate unit. As mentioned, the agricultural mower may also include a conditioner unit between the mower unit and the swathing unit, which bruises and crushes the stalks of the cut crop to aid wilting. In practice, the conditioner also serves to lift the crop onto a belt conveyor. The conditioner unit may be of various forms, e.g. a tine type having a plurality of flail arms mounted on a rotating bar, or a roller type having a pair of contra-rotating rollers providing a nip through which the cut crop is passed, or it may be of any other type, so as to aid wilting.

The operating unit may be carried by a carrier vehicle, for example a tractor. In the case of an agricultural mowing machine cutter units may be mounted on one or both sides of the carrier vehicle, each cutter unit may be carried by a carrier assembly that is attached to the rear of the carrier vehicle and includes a carrier arm. The carrier assembly may include a pivot mechanism that allows the position of the carrier arm to be adjusted. The carrier arm may for example be located in a substantially horizontal working position in which the cutter unit is positioned close to the ground to cut the crop, or an upright transport position in which the cutter unit is lifted behind the cab of the vehicle, allowing the vehicle to travel along a road. It may also be possible to raise the carrier arm and the cutter unit to a headland position in which the cutter unit is lifted a small distance above the working position, allowing the tractor to turn when it reaches the end/edge of a field.

The carrier assembly may include a carrier arm, a suspension system for suspending an operating unit from the carrier arm, a supporting structure for mounting the carrier arm on a carrier vehicle, a pivot mechanism that enables pivoting movement of the carrier arm relative to the supporting structure, and a first actuator that drives pivoting movement of the carrier arm between a working position and a transport position, wherein the carrier arm may include an inner part, an outer part that can be telescopically extended and retracted relative to the inner part, and a second actuator that drives the outer part to adjust the length of the carrier arm. The suspension system generally serves to maintain the operating unit at a consistent elevation from ground level and absorb sudden movement during operation.

Other types of agricultural machine that can be suspended from a carrier assembly include rakes, and tedders may be mounted in a similar manner with an operating unit (a rake, tedder) mounted on one or both sides of a carrier vehicle and carried by a carrier assembly that is attached to the rear of the carrier vehicle and includes a carrier arm.

It is well known to provide a coupling mechanism to removably attach an operating unit to another agricultural machine. A coupling mechanism allows for modular use of the agricultural machine units wherein different combinations of complementary operating units can be attached to the carrier vehicle. For example, a mower can be suspended from a carrier arm and a belt conveyor can be coupled to the carrier arm assembly so that it is suspended downstream of the cut crop. Modular design allows the same carrier arm to be used with a range of combinations of agricultural machines or isolated machines, however, the method of coupling the units can be difficult and time-consuming for the operator. Furthermore, the positions of the engageable elements of the coupling mechanism may be only adjustable by automated systems and therefore difficult to align. As the operating units are very heavy they cannot easily be manoeuvred into an aligned configuration. Providing a capability to quickly remove one operating unit from another is useful because removing a unit entirely when not required (as opposed to being moved to a disengaged position) reduces the overall weight resulting in less fuel consumption and ground compaction.

EP1489896B1 describes a mower conditioner with a swathing unit. The units are attachable to a carrier vehicle and can be pivoted to a vertical transport position. The hitching structure is attached by a three-point hitching device to the carrier vehicle which is time consuming to use when decoupling is needed, e.g. there is no means for quick coupling or decoupling of the arms.

Various quick coupling devices are known. For example, US2005/0017473A1 discloses a coupling mechanism for quick coupling of operating units to work vehicles. The geometry involves three hooks which form the coupling that can be mounted on a category 4 hitch and adapted for a category 3 hitch of a tractor. Implements are pulled directly behind a work vehicle.

U.S. Pat. No. 6,988,560B2 discloses a quick coupling device for attaching a towed implement to a tractor frame or chassis. The coupling device comprises two hooks and two eyes which can be used to support a drawbar and are positioned so that implements are pulled directly behind a work vehicle.

GB1206648, US2010/031622, EP2789224 and WO99/09806 describe various coupling structures suitable for agricultural machines.

SUMMARY OF THE INVENTION

The current invention seeks to address the problems of difficulty of coupling/decoupling to carrier arms identified above and thereby time intensiveness of coupling/decoupling, that exist in crop conveyance unit coupling mechanisms. Another advantage of the present invention is that the modular design enables minimal weight bearing on the carrier arm according to the use. At the least the invention should provide the public with an alternative swathing unit coupling means.

According to a first aspect of the present invention, a crop conveyor (e.g. a swathing unit) is provided according to claim 1.

The invention is intended to provide a faster assembly time for attaching the conveyor unit to an operating unit, especially due to the self-alignment of gendered elements. Another advantage of the invention is the effectively modular design resulting in reduced weight when the conveyor unit is removed. This arrangement might be desired by the operator in order to create a wide swath which could enable cut crop to dry faster.

The coupling mechanism of the invention comprises two engageable parts: generally male and female elements. The solution can be in the form of a mating A-frame type configuration or a hook and bar arrangement where the hook includes a tapered opening to receive the bar. When the gendered elements are aligned one above the other, the male part automatically aligns with the female part as the tapered edges guide them into place under the force of gravity. When the interlocking parts are slotted firmly in position they can be locked together by the use of one or more bolts, pins or other fastening means.

The coupling mechanism optionally features the male element of the mechanism being incorporated with the mounting structure and the female element being found on the conveyor unit, however, the opposite configuration is possible where the coupling mechanism includes the female element of the mechanism being incorporated on the mounting structure whereas the male element is found on the conveyor unit. According to a method of implementation the conveyer unit can be provided with or supported by a trolley and therefore the male element of the coupling mechanism may be easily aligned to register with the female element of an operating unit (e.g. mower) that is then raised into engagement so that, when coupled and the trolley is removed (or by having retractable wheels), it is held in place by gravity.

In the case of the conveyer unit comprising the female element, the female element includes an opening which is tapered/converging in an upward direction. The male protrusion may then also be tapered upward and inwardly toward a point. In this case, the two are brought into vertical alignment and then the mounting structure/operating unit is raised vertically by the control system. In doing so, the conveyer unit is guided into a fixed position and held by gravity. It is then possible to secure this arrangement manually or automatically with a fastening means such as a bolt or pin.

In one form the male element or female opening may be extended at one end to improve alignment characteristics. For example, in an A-frame configuration, the male element may include an apex ridge that extends further from the mounting structure than a lower portion thereof. Such a configuration provides greater opportunity for engagement with the female opening as the elements are moved into engagement. In effect, such a configuration enables a second to/from degree of freedom for encouraging engagement in addition to a first side-to-side degree of freedom provided by the tapered/converging elements; and in addition to the third up/down degree of freedom provided by the manoeuvring the mounting structure up into position relative to the conveyor.

Conversely, when the conveyor unit coupling feature is male, the female receiving part on the mounting structure and the complementary male element may be tapered/convergent downwards. Then a similar process of raising the mounting structure by the control system similarly guides the coupling connection into a stable configuration wherein the conveyor unit is held in place by gravity before being secured.

The male and female elements are preferably arranged so that the weight bearing member in the engaged configuration is lowermost so as to provide support from the lifting of the mounting structure.

The coupling mechanism optionally includes the tapered female element being of a truncated triangle or "A" geometry. The male element may have a complementary triangular "A" shape. This may be alternatively described as a "V" configuration.

A generally triangular configuration provides a simple geometry for achieving the desired effect. It should be noted that a semi-circle, half-hexagon or any other tapered or truncated tapered geometry, that could achieve a similar function of self-guiding the engageable elements, is also possible. Indeed, a particular embodiment of the invention features a cross bar male element (e.g. a cylindrical member) to be received by a pair of hooked female elements (e.g. a complimentary circular opening).

The coupling mechanism of the crop conveyor/swathing unit is optionally attachable to an operating unit that is a mower conditioner.

The coupling mechanism may be associated with a belt conveyor. In an alternative form it may be associated with an auger conveyor. The coupling mechanism is intended for improved/simplified removable attachment of any suitable conveyor/swathing unit device to a mower or the like. The coupling mechanism of gendered parts is located at a position distant from the conveyor belt or auger by a unitary support arm. Preferably the support arm extends from a connected end proximal a rear side of the conveyor and curves around and back toward a frontal direction (i.e. a direction of travel of the machine) where it terminates in one-part of the two-part coupling mechanism.

The conveyor is preferably provided with an actuator for optionally lifting the conveyor unit out of the path of the crop flow to allow wide spreading. The actuator may also provide fine adjustment of the elevation of the conveyor relative to the operating unit, e.g. mower conditioner.

A mating part of the coupling mechanism is preferably directly adjoined to the operating unit (e.g. mower) or a suspension system of a telescopic carrier arm so that it moves with the operating unit. The carrier arm otherwise operates in a known manner, e.g. associated with a suspension system.

Various configurations for mounting the supporting part, i.e. the mounting structure, of the coupling mechanism are possible. An advantage in the case of coupling to the suspension system of a carrier arm is that no extra weight is placed on the operating unit.

The invention envisages an agricultural apparatus for mounting on a carrier vehicle comprising a carrier arm on which is mounted an operating unit coupled to a crop conveyor by the coupling mechanism described herein.

The coupling mechanism preferably includes a hydraulic connection, e.g. a hydraulic multi-connection, in addition to the mechanically mating parts that support the respective structures. The hydraulic connection provides motive power to the conveyor operation.

The coupling mechanism and/or associated structure preferably includes an electrical connection. Such a connection may enable electronic signals to be communicated therethrough. In a particular embodiment, control software is configured to recognise connection of a crop conveyor to an operating unit, i.e. implementing automatic detection. When identified, an icon can appear on a control display visible to the operator. Operating parameters can then be input to the control system which subsequently controls the crop conveyor. When the device is uncoupled then the icon and associated functionality will disappear.

In a further aspect of the invention there is described a method of coupling a conveyor unit to a mounting structure, wherein the conveyor unit includes one part of a two-part coupling mechanism and the mounting structure includes another part of the two-part coupling mechanism, including the following steps:

(a) providing a trolley to support the conveyor unit;
(b) by movement of the trolley, aligning a tapered end of one part of the two-part coupling mechanism above or below an opening of the other part of the two-part coupling mechanism;
(c) moving the mounting structure upwards so that the two parts of the two-part coupling mechanism are engaged;
(d) fastening the parts securely in the engaged position by fastening means;
(e) optionally connecting hydraulic and/or electric lines between the conveyor unit and the mounting structure or its associated operating unit.

In a yet further aspect of the invention there is described a method for decoupling a conveyor unit from a mounting structure, wherein the conveyor unit includes one part of a two-part coupling mechanism and the mounting structure includes another part of the two-part coupling mechanism, including the following steps:

(a) resting the conveyor unit on a trolley via controlled lowering of the mounting structure;
(b) unfastening fastening means between the two parts of the two-part coupling mechanism;
(c) optionally disconnecting hydraulic and/or electric lines between the conveyor unit and the mounting structure or its associated operating unit; and
(d) lowering the mounting structure so that the parts disengage.

Preferably the trolley, supporting the conveyor unit, is rolled away and parked for later use. In an alternative form wheels may be built into the apparatus, e.g. as retractable or removable components.

The methods of coupling/decoupling described above are faster and simpler than can be achieved by the prior art due to the use of the trolley and the self-guiding aspect of the tapered two-part coupling mechanism. The conveyor unit can be decoupled from the mounting structure by operation of a control system and the supporting trolley. This is performed such that the mounting structure is unfastened and then lowered from the supported conveyor unit to release the coupling elements. Movement of the mounting structure may be actuated by electric, manual or hydraulic systems. The mounting structure might be moved by control of the carrier arm and might be performed from the cab of the tractor or by a control system.

The invention can be further generally defined as a mower conditioner with a removable belt conveyor, wherein the mower conditioner and belt conveyor are removably coupled by a coupling mechanism comprising: engageable gendered elements in the form of a male element and a female element configured for receiving the male element during engagement, wherein one of the gendered elements is attached to the conveyor and the other one of the gendered elements is attached to the mower conditioner; and wherein said gendered elements are upwardly or downwardly tapered for facilitating self-guiding of the male element into engagement with the female element by upward movement of the mower conditioner in relation to the conveyor.

BRIEF DESCRIPTION OF THE DRAWINGS

FIG. 2 (c) shows a side elevation cutaway view of the elements from FIGS. 2 (a) and (b) in a coupled configuration wherein the male element is seen to project inwardly within the recess of the female element.

FIG. 4 (b) shows the carrier arm and operating unit of FIG. 4 (a) having been moved vertically upwards so that the gendered coupling elements are engaged.

FIG. 5(b) shows placement of the hydraulics connection of FIG. 5 (a) relative to the telescopic arm, the belt conveyor and the coupling mechanism.

FIG. 6 (b) shows the same features as FIG. 6 (a) from a rear, high perspective angle.

FIGS. 8 (b) and (c) show the embodiment of FIG. 8 (a) in a side elevation view in uncoupled and coupled arrangements respectively.

FIGS. 11 (a), (b) and (c) show perspective views of a coupling procedure for the mechanism of FIGS. 10 (a) and (b).

DETAILED DESCRIPTION OF THE PREFERRED EMBODIMENTS

Advantages of the invention will become apparent from the following detailed description, taken in conjunction with the accompanying drawings that illustrate various aspects and embodiments of the invention. However, the scope of the invention is not intended to be limited to the precise details of the embodiments, with variations apparent to a skilled person deemed also to be covered by the description of this invention.

Furthermore, terms for components used herein should be given a broad interpretation that also encompasses equivalent functions and features. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. The present description refers to embodiments with particular combinations of features, however, it is envisaged that further combinations and cross-combinations of compatible features between embodiments will be possible.

Figure 1A:
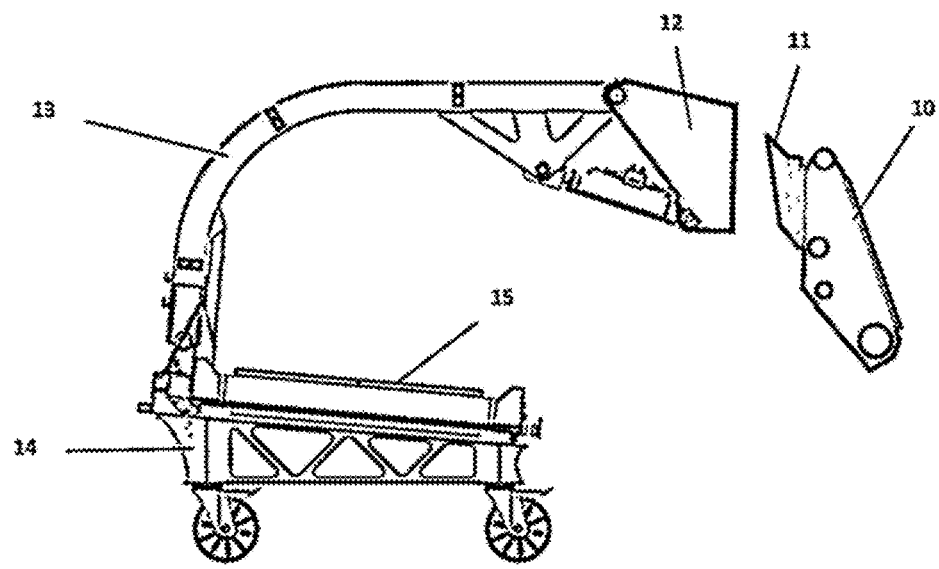
FIGS. 1 (a) and (b) show side elevation views of a belt conveyor mounted on a trolley with a coupling mechanism in a decoupled and coupled configurations respectively.
Figure 1:
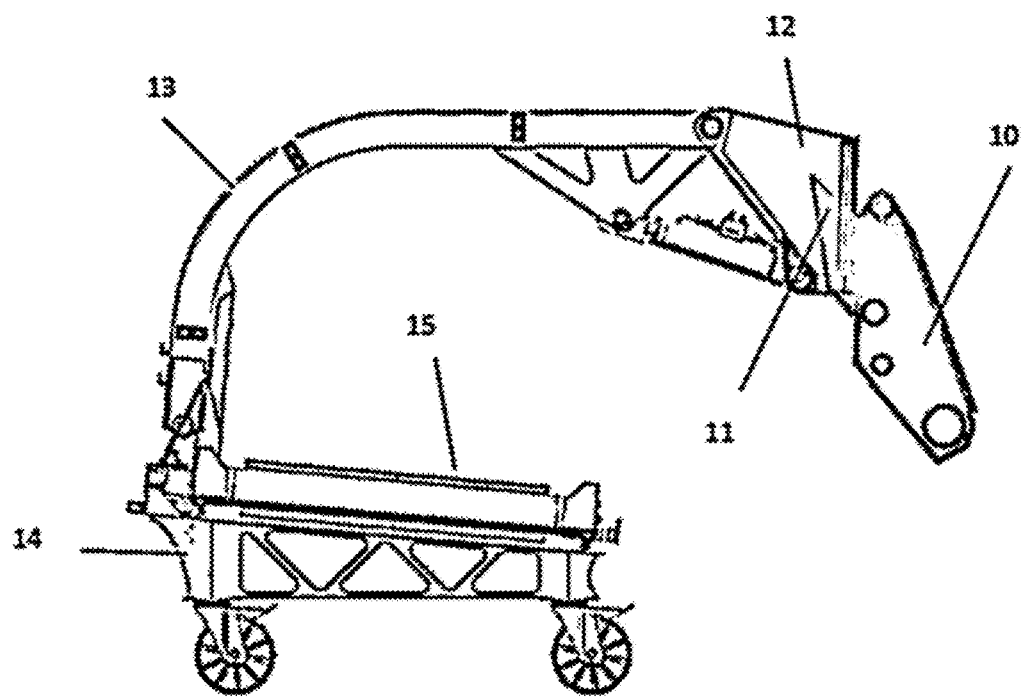

Referring firstly to FIG. 1 (a), the invention is best described according to a general method of implementation. Particularly, a side elevation view of a belt conveyor 15 resting on a trolley 14 is shown wherein the belt conveyer is attached to a coupling mechanism by a single (referred to herein as "unitary") supporting arm 13. The coupling mechanism in this embodiment comprises a female element 12 and a male element 11 where the male element 11 is attached to a mounting structure 10 which can, in turn, be attached to a carrier arm of an operating unit (not shown).

FIG. 1 (b) shows the same elements as FIG. 1 (a) but here the male and female elements are interlocked, providing support for the belt conveyor 15 were the trolley 14 to be removed. It should be noted that although a belt conveyor is shown and described herein, any type of crop conveying device, including an auger conveyor, could be so attached. Furthermore, the operating unit may be other than a mower conditioner as illustrated. Finally, it should be noted that although the illustrated arrangement shows a male part associated with the operating unit and female interlocking part shown associated with the conveyor, it could be that the parts are reversed and inverted.

An upwardly tapered shape of the interlocking elements as shown achieves a self-aligning effect wherein, when positioned such that the tip of the male element 12 is positioned within and beneath an opening of the female element 11, the mounting structure 10 may simply be raised vertically via a control system and the female element will slide horizontally according to the position of the apex of the male element until the correct alignment/registration has been reached. The geometry of the preferred embodiment is further explained below.

Figure 2:
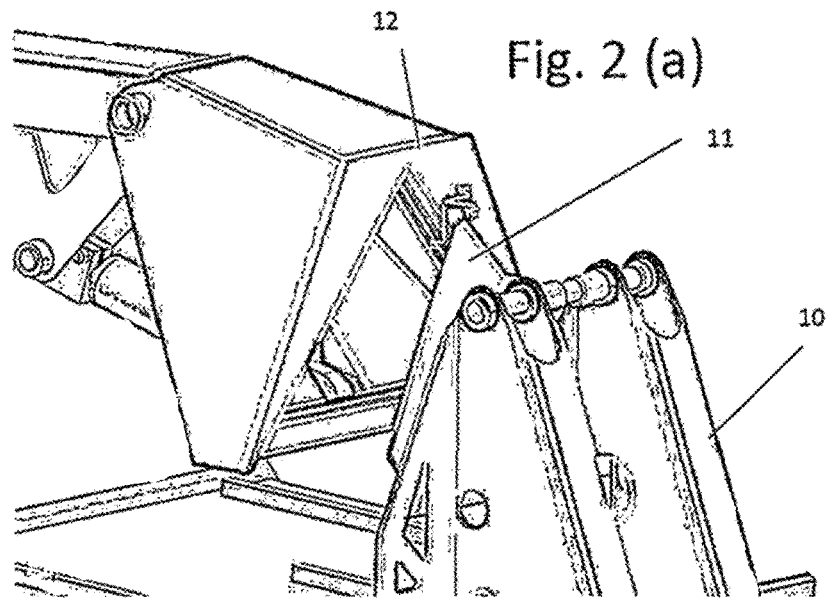
FIGS. 2 (a) and (b) show perspective views of an upwardly tapered coupling structure wherein the female element is adjoined to a conveyor unit and the male element is adjoined to a mower, in a decoupled and coupled state respectively.
Figure 2:
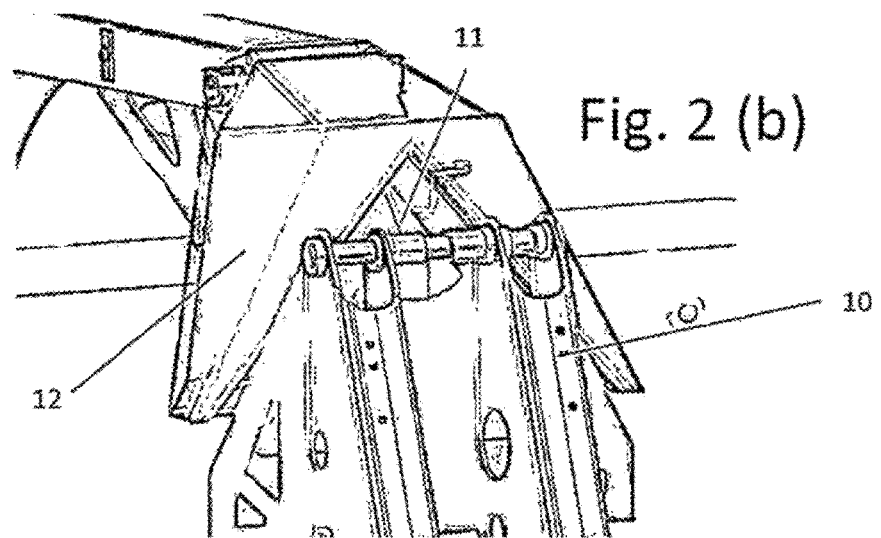
Figure 2:
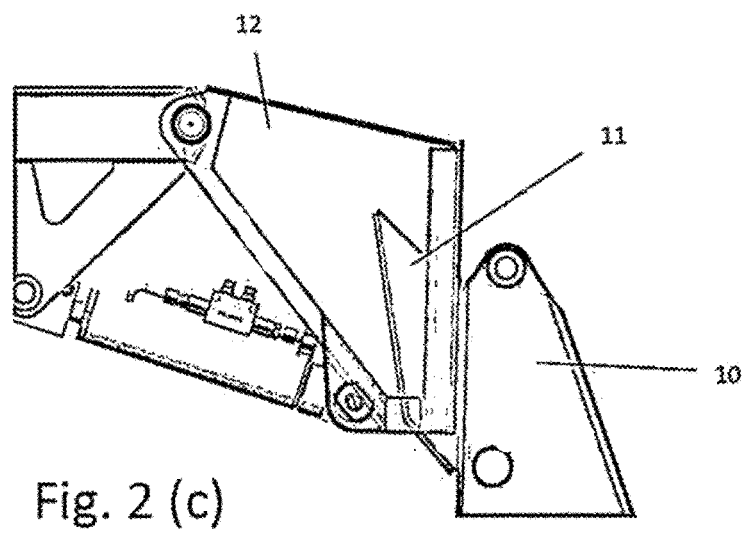

FIG. 2 (a) shows a close up view of the interlocking male 11 and female 12 elements prior to being engaged whereas FIG. 2 (b) shows the male element 12 extending from the mounting structure 10 during mating with the female element 11. FIG. 2 (c) shows a side view of the mating male 11 and female 12 elements, illustrating how they are configured to interlock, and how the mounting structure 10 is configured to provide lift for the conveying unit. For clarity, female element 12 is shown in ghosted view so that male part 11 is visible within.

Particularly, it is apparent in the view of FIG. 2 (c) that an apex ridge of male part 11 extends upwardly and outwardly from mounting structure 10 to provide a broad surface upon which to engage with edges of the opening of female part 12 (the opening being best visible according to FIG. 2 (a). A broad while upwardly extending surface provides greater opportunity for engagement with the female part and hence provides improved simplicity for an operator moving trolley 14 into position. It will be apparent that as male part 11 raises into the opening the conveyor unit extending therefrom is automatically registered with the operating unit (e.g. mower from which mounting structure 10 extends) and fixed together by force of gravity.

Figure 3:
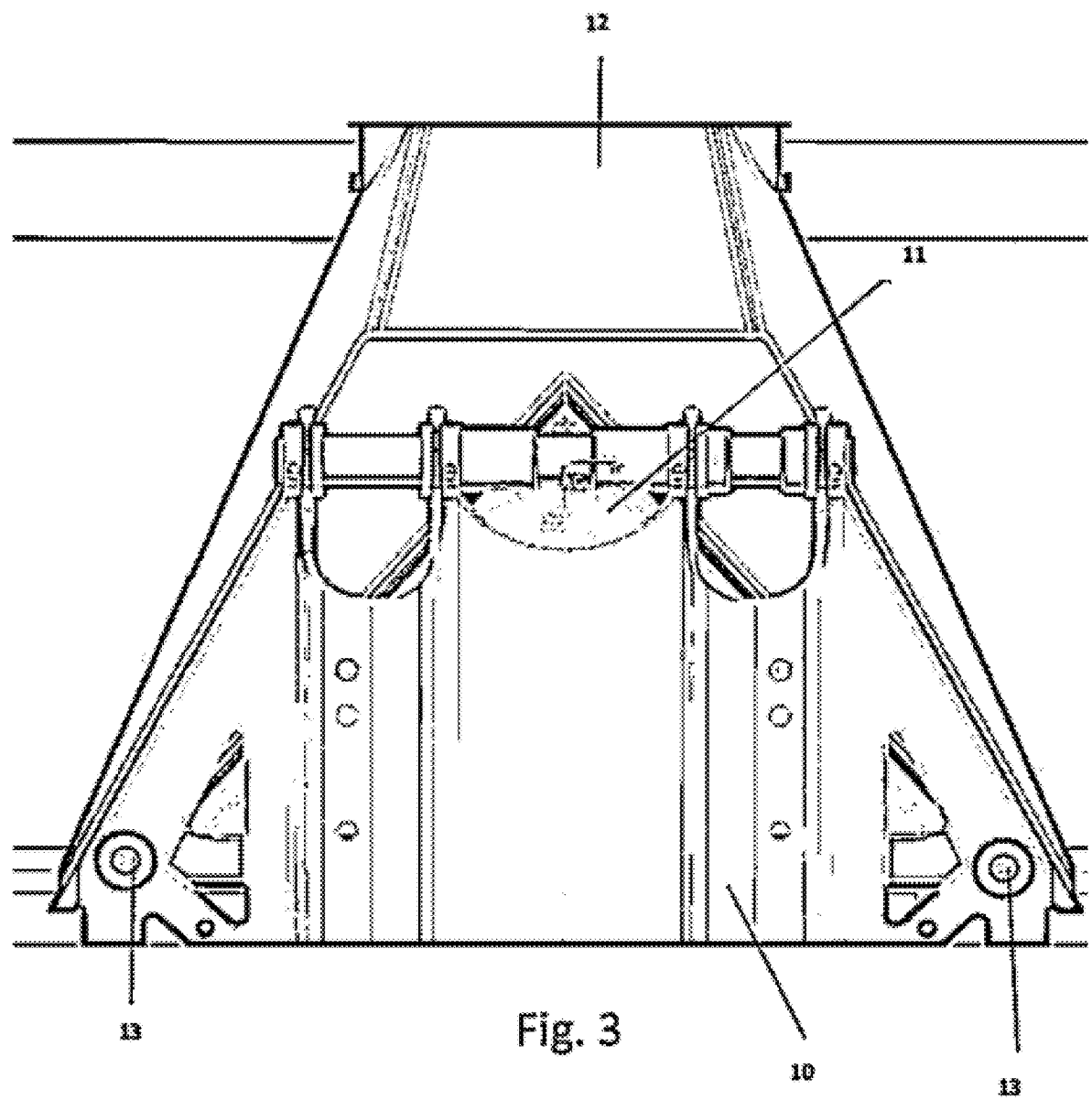
FIG. 3 shows an end view where positions of two fastening bolts/pins are seen, for use when the coupling mechanism is in the coupled configuration.

FIG. 3 shows a close up view of the correctly aligned and mated female 12 and male 11 elements locked into position by suitable fastening means 13 at locations in the support structure 10. Fastening means may be in the form of bolts, pins, spring loaded clips or other biasing members, e.g. located at externally accessible corners of the mated parts. The fastening means may be manually implemented or automatic, e.g. actuator means such as a solenoid. Fastening means 13 secures the respective male and female parts of the two-part coupling mechanism together but, preferably, does not need to carry any of the substantive weight. It is apparent from the illustrated embodiment that male part 11 supports the substantive weight of female part 12 and its associated conveyor unit.

Figure 4:
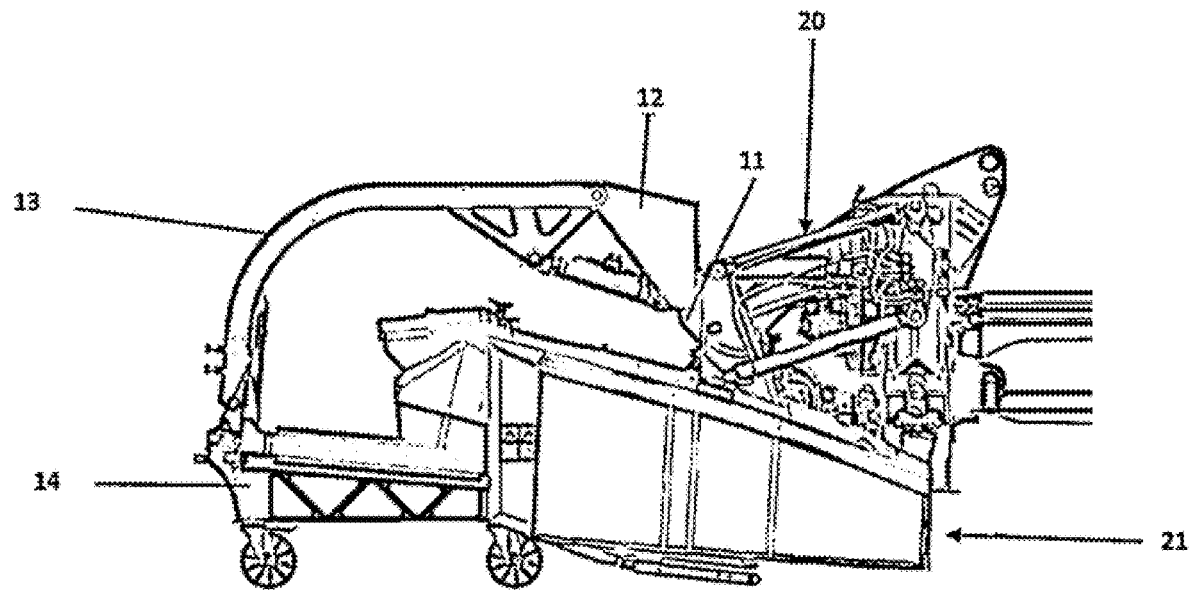
FIG. 4 (a) shows a side elevation view of a belt conveyer arranged on a trolley proximate a carrier arm and operating unit such that the coupling elements are aligned.
Figure 4:
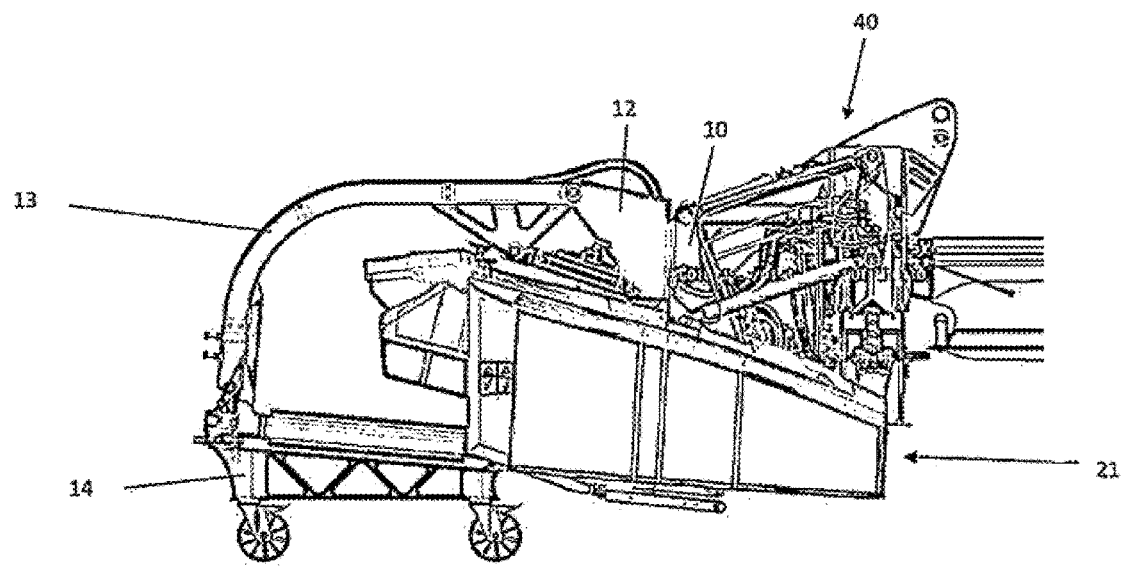

FIG. 4 (a) shows the arrangement of FIG. 1(a) but where a suspension system 20 and mower conditioner 21, from which the male part 11 of the two part coupling mechanism extends, is visible. FIG. 4 (b) shows the same apparatus as FIG. 4(a) moved into the interlocked position of FIG. 1(b).

FIG. 4(b), similarly, relates to FIG. 1(b) with the addition of the suspension system 20 and the mower conditioner 21; showing the assembled modular apparatus wherein the mounting structure 10 and male part 11, operating unit (21) and carrier arm 40 have been raised to an elevated position to engage the male and female elements of the coupling mechanism, but without being raised sufficiently high to lift the conveyor unit from the trolley 14. In this embodiment, the carrier arm can be mounted onto a carrier vehicle (not shown) and the mower conditioner can be mounted on the carrier arm via the suspension system 20.

Figure 5:
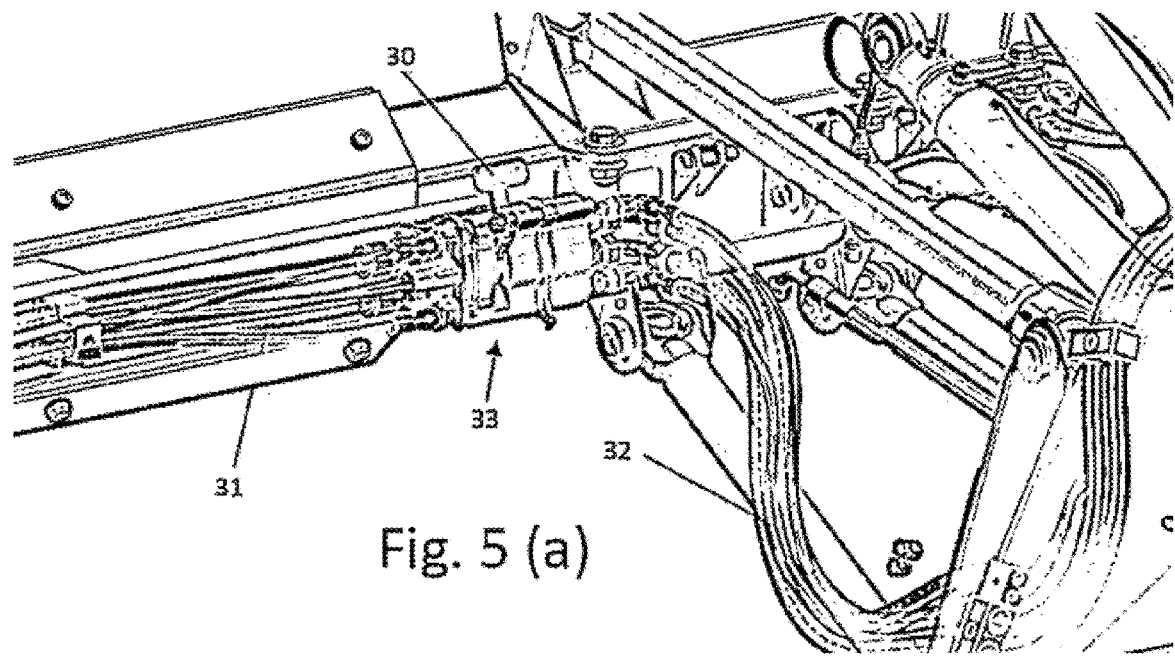
FIG. 5 (a) shows a perspective view of a hinged securing mechanism for securing a hydraulics connection positioned at the base of a suspension system and mounted on the carrier arm.
Figure 5:
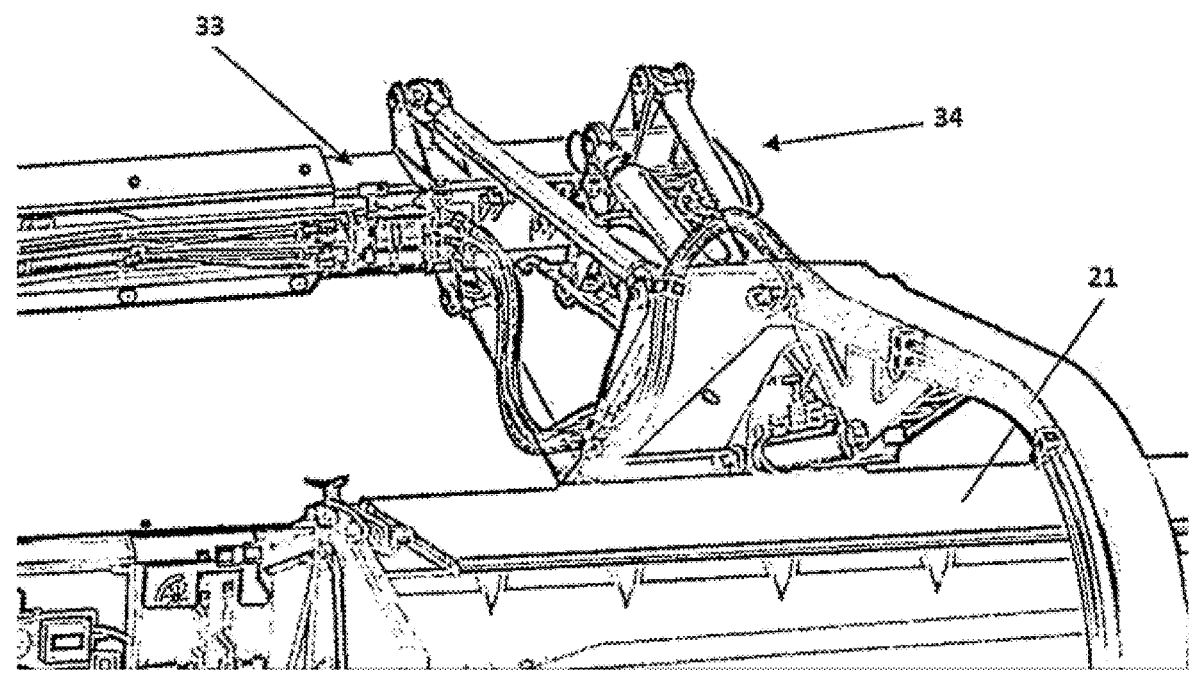

In FIG. 5 (a) a close up perspective view of a hydraulics connection unit 33 is shown. This unit connects the hydraulic lines of the carrier arm 31 with the hydraulics of the conveyor unit 32 by locking the connection by use of a handle or lever 30. Engaging handle 30, in a raised position as illustrated, mechanically locks the open ends of the hydraulic lines 31 and 32 and seals them in contact. The connection unit 33 is unlocked by moving handle 30 to a lowered position against its housing. For context, FIG. 5 (*b*) shows the hydraulic connection 33 in a zoomed out image showing it in relation to the suspension system 34 and the operating unit 21.

Figure 6:
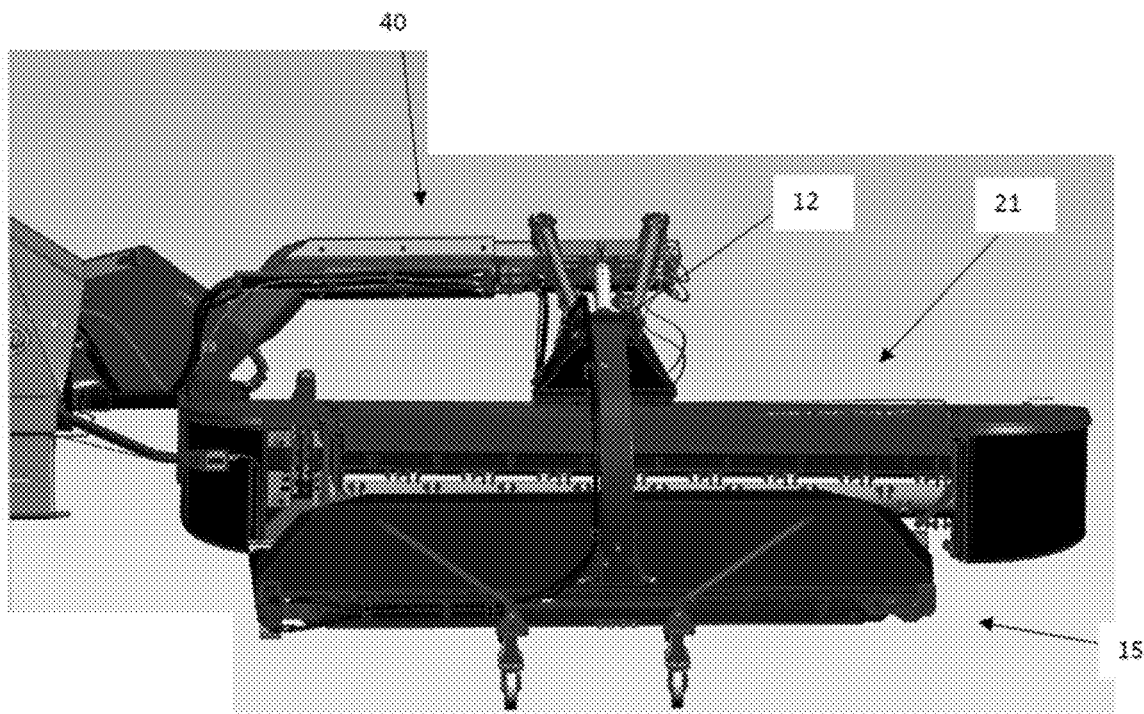
FIG. 6 (a) shows a rear view of an operating unit, e.g. mower conditioner, coupled to a belt conveyor both of which are mounted on a telescopic carrier arm, extending laterally from one side of a carrier vehicle (not shown).
Figure 6:
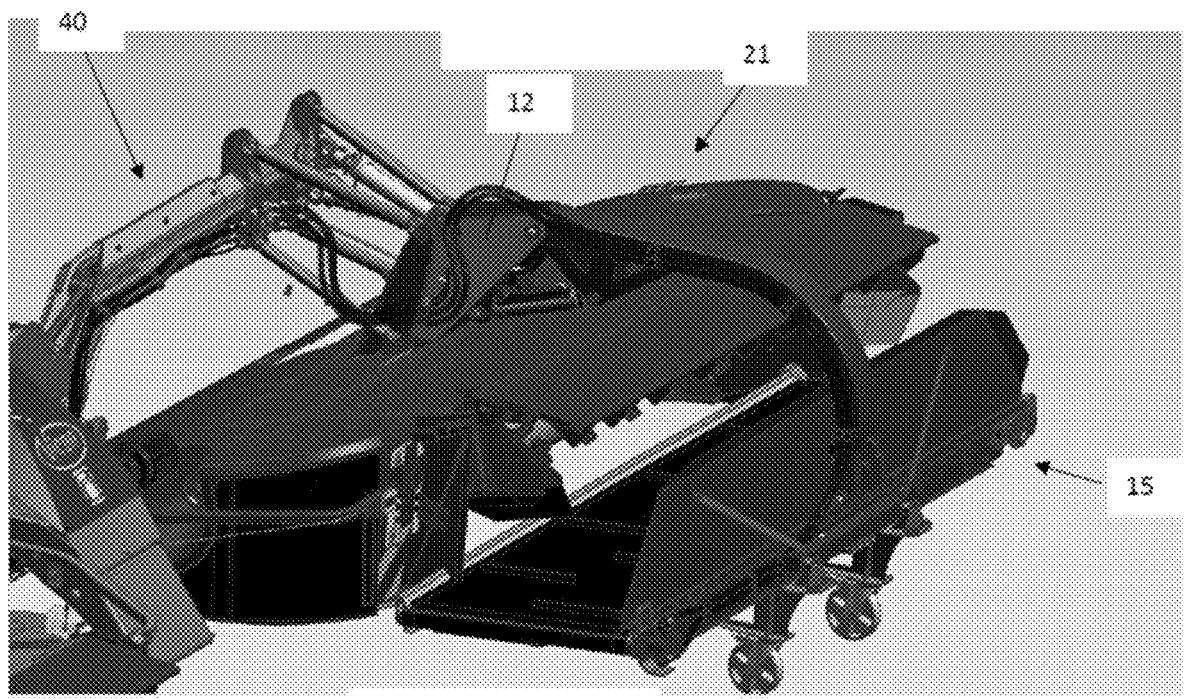

FIG. 6(*a*) shows an embodiment of the invention wherein a telescopic carrier arm 40 supports both the operating unit (mower conditioner) 21 and the conveyor unit (belt conveyor swathing unit) 15 by engagement of the female element 12 with the male element (not visible). FIG. 6 (*b*) illustrates the same embodiment from a different perspective angle wherein a belt of the belt conveyor 15 is visible. Trolley 14 can be removed such that the conveyor 15 is fully supported through its coupling to the mower suspension system extending from arm 40. At rest conveyor 15 is maintained at a consistent elevation relative to the mower 21 from a ground surface. By virtue of connected hydraulics (see FIGS. 5 and 7) the conveyor 15 may be raised or lowered relative to mower 21 as needed during operation. Relative height adjustment can be incremental or for movement to a non-operational position (e.g. for wide spreading). However, when not needed at all the present invention enables relatively rapid decoupling so that the conveyor can be stored away from the vehicle and contributes no weight to continued operation. Weight reduction results in less fuel consumption, ground compaction and overall wear on arm 40.

Figure 7:
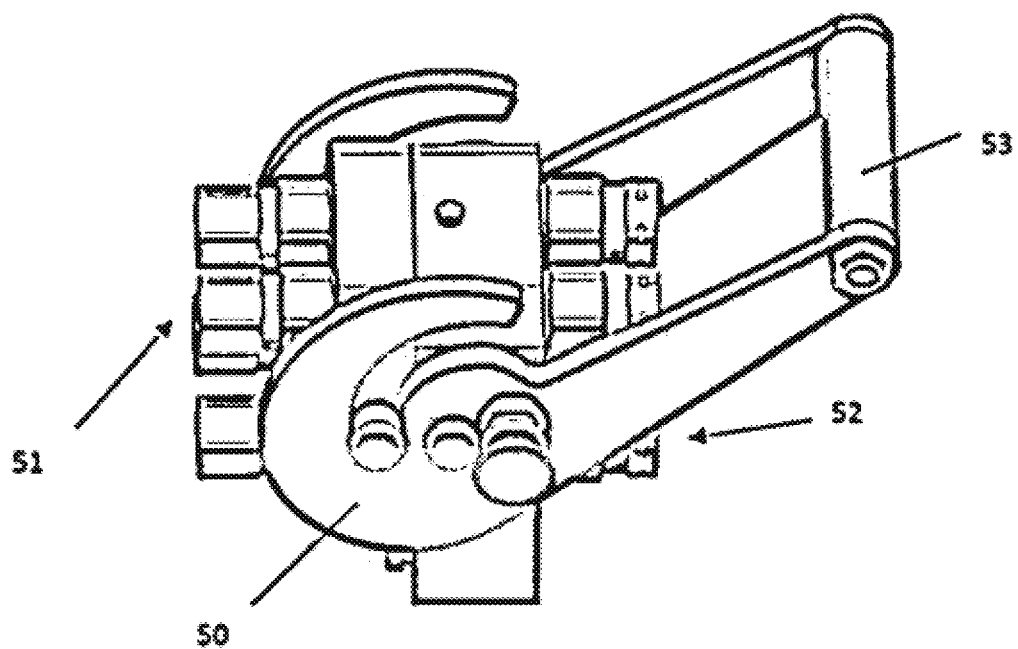
FIG. 7 shows a perspective view of an alternative hydraulics connection separated from the rest of the apparatus.

FIG. 7 shows a perspective view of an alternative hydraulic connector separated from the rest of the apparatus where the ends of hydraulic lines originating from the mounting structure would be connected at 51 and the ends of the hydraulic lines for the conveyor unit would be connected at 52. The embodiment of the hydraulic connection device as illustrated provides a mechanical lock of ends 51 and 52 by turning the handle 53 to actuate a cam structure 50 and exert a pressing force to seal the facing surfaces of ends 51 and 52 together. A suitable o-ring provides a seal for each individual hydraulic line (four are shown).

The connection device of FIG. 7 may be installed at any suitable position relative to the conveyor or carrier arm/mower to provide a fixed connection point. In some forms the connector may be floating or relocatable in order to adapt to different configurations. It will be apparent that other locking mechanisms may be used to achieve the effect of sealing the hydraulic lines together at the ends 51 and 52.

Figure 8:
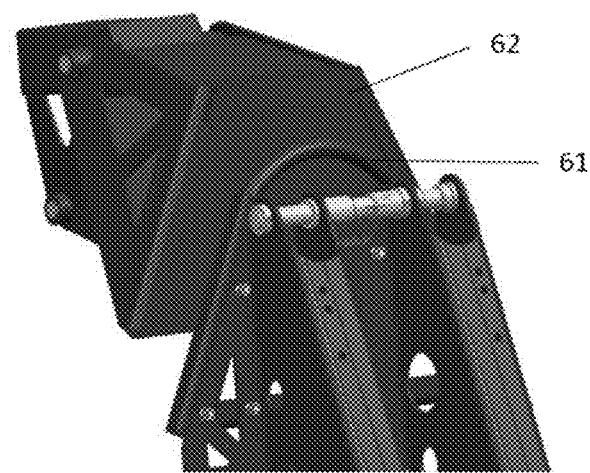
FIG. 8 (a) shows a perspective view of an alternative embodiment of the coupling mechanism.
Figure 8:
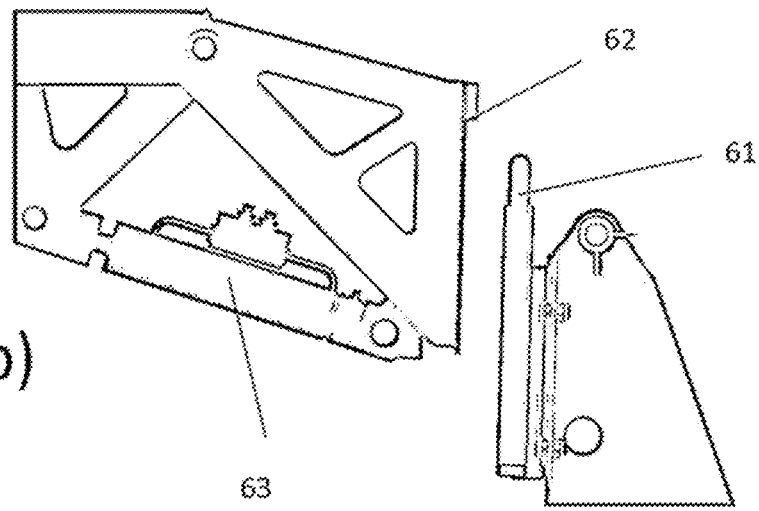
Figure 8:
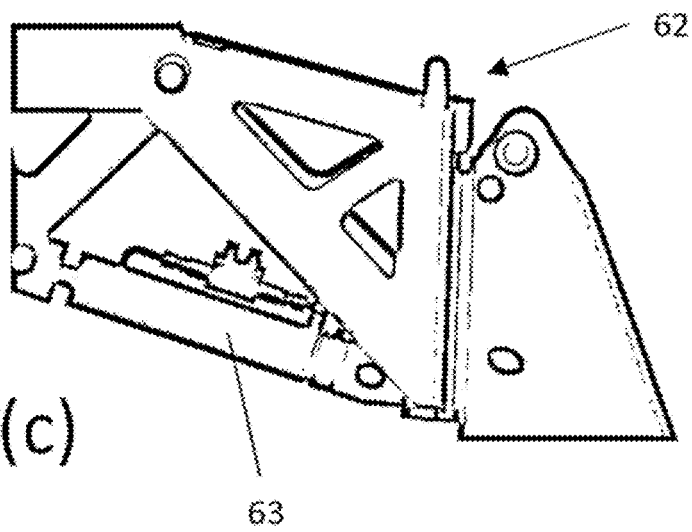

A second exemplary embodiment of the invention is illustrated by FIGS. 8 (*a*), (*b*) and (*c*). In this embodiment the coupling mechanism comprises a male A-shaped metal frame 61, engageable with a metal truncated triangular recess 62, analogous to the arrangement of the first embodiment. Components are shown separated according to FIGS. 8 (*a*) and (*b*) and coupled according to FIG. 8 (*c*). The illustrated embodiment also shows an hydraulic actuator 63 attached to the conveyor unit. This hydraulic actuator is capable of lifting the conveyor unit out of the path of the crop as it is leaves the operating unit. It will be apparent to a skilled person that although a hydraulic actuator is shown, any suitable actuator may be used. Furthermore, the actuator might be operated from the cab of the carrier vehicle via a remote control or suitable connection.

Figure 9:
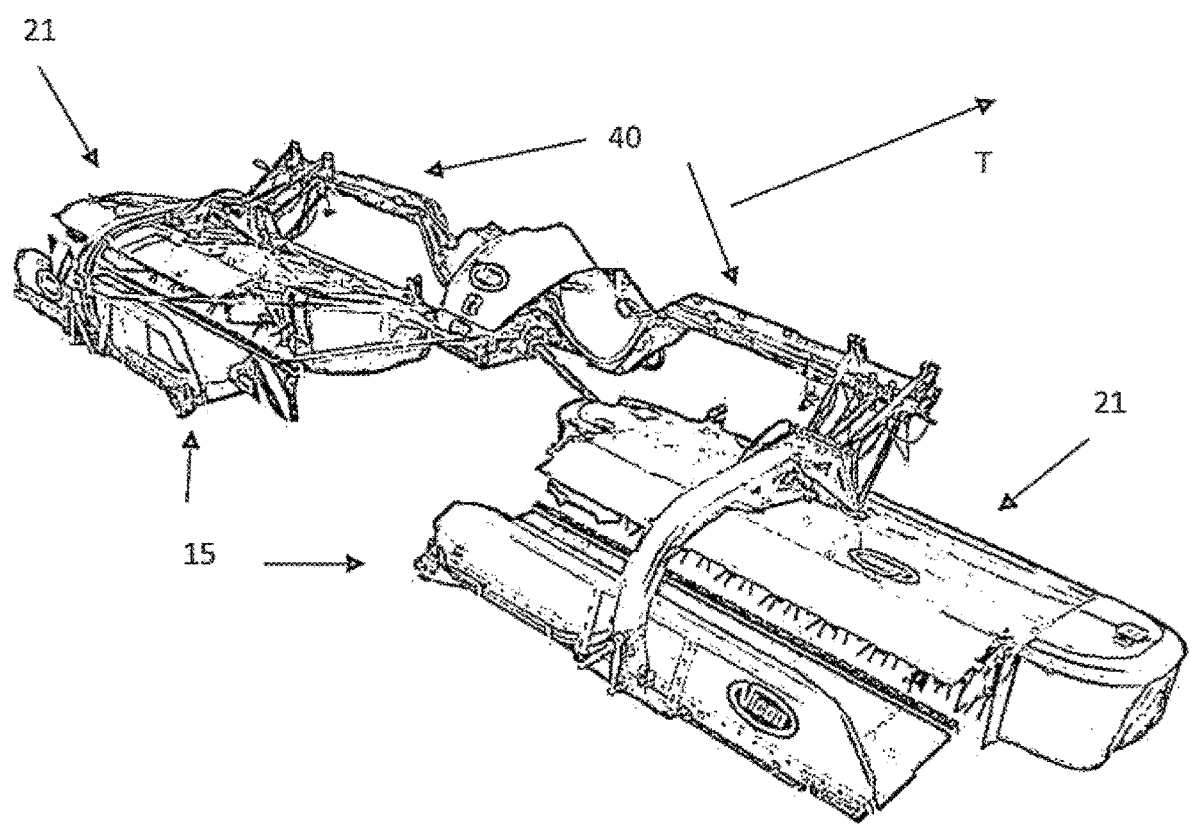
FIG. 9 shows an overview of two telescopic arms mounted laterally on a common mounting for supporting two mower conditioner units coupled with belt conveyors according to the invention.

FIG. 9 is an illustrative view (exemplified by the embodiment of FIG. 8) wherein two belt conveyor units 15 are attached to two mower conditioner units 21 by the coupling mechanism and unitary support arm of the invention and mounted on telescopic carrier arms 40 with the carrier vehicle not shown. In operation the carrier vehicle moves in a direction of travel T (e.g. towards the right of the page) so that crop is cut and conditioned by the mower conditioner units 21, then deposited onto the belt conveyor units 15. Cut crop material is subsequently transported by the conveyor into a central swath behind the carrier vehicle.

An electrical connection associated with the coupling mechanism or otherwise provided between the conveyor and operating unit or agricultural machine enables electronic communication such as detection and identification of an attachment. In this way an icon representing the attachment can appear on an operator display, where parameters can be monitored/adjusted accordingly. Such a "handshake" between components is a useful aspect of the system. e.g. the machine automatically detects when belts are mounted or not. Mounting status (on/off) can be shown in a simple visual way, e.g. just by turning lights on/off or green light/red light illuminated. In the case of having a user screen, the belt mounting status can be visualized by having any sort of belt pictograms shining, flashing and so forth. For identifying the right or left belt, the letters R for right and L for left can be assigned to the (un-) mounted belt units. Furthermore, the mounting/unmounting action can be supported by any equal or distinctive (on/off) acoustic sound (s).

Figure 10A:
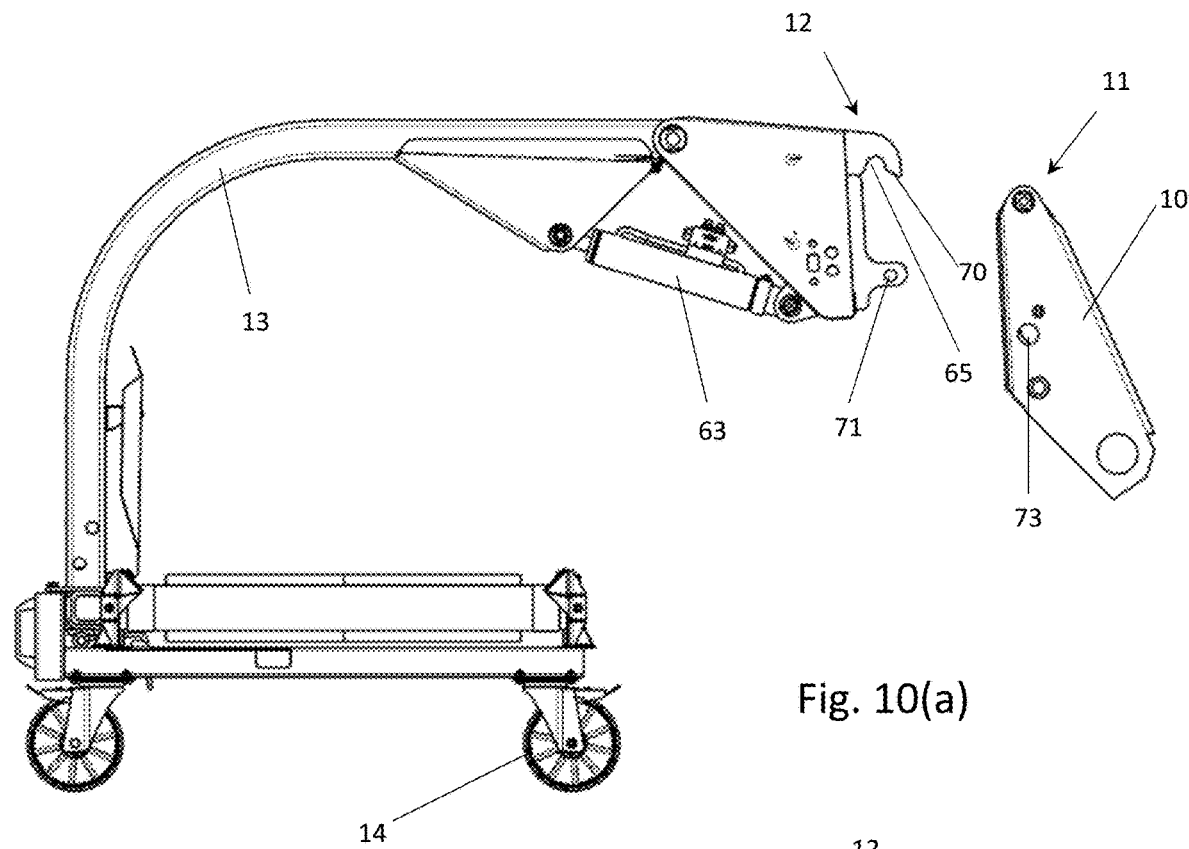
FIGS. 10 (a) and (b) show side elevation views of a belt conveyor mounted on a trolley with a coupling mechanism in decoupled and coupled configurations respectively.
Figure 10B:
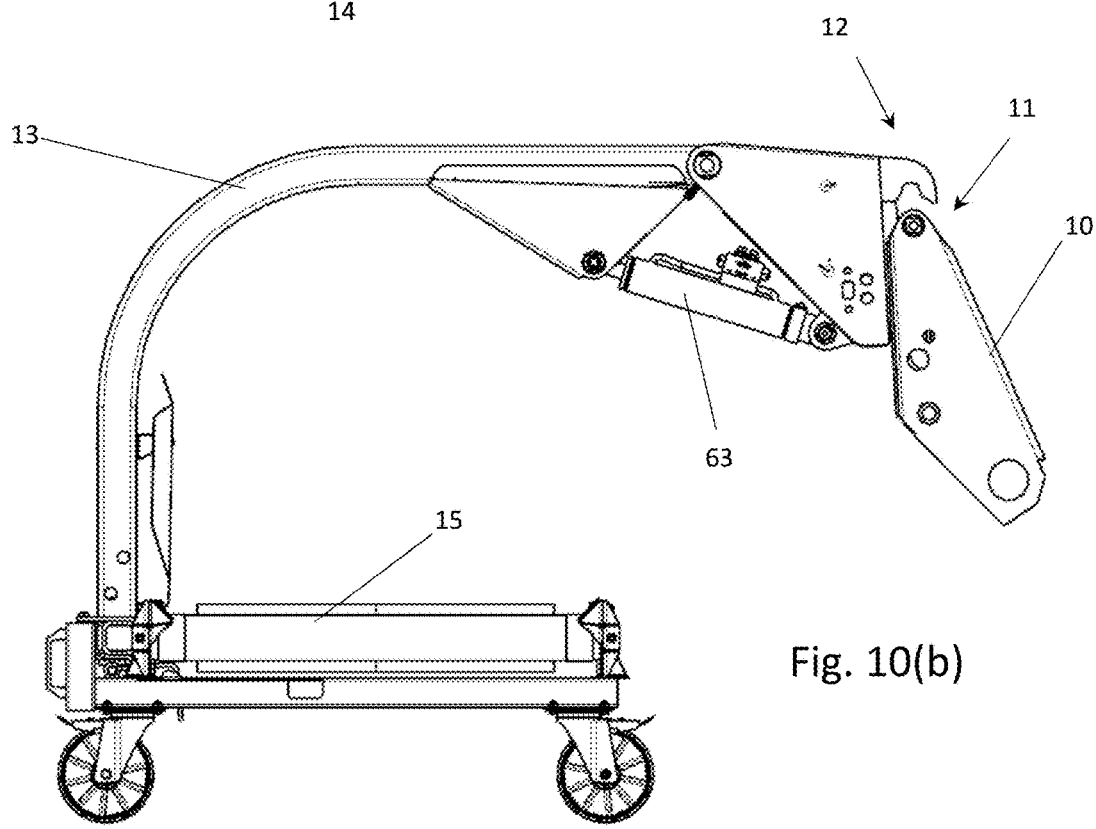
Figure 12:
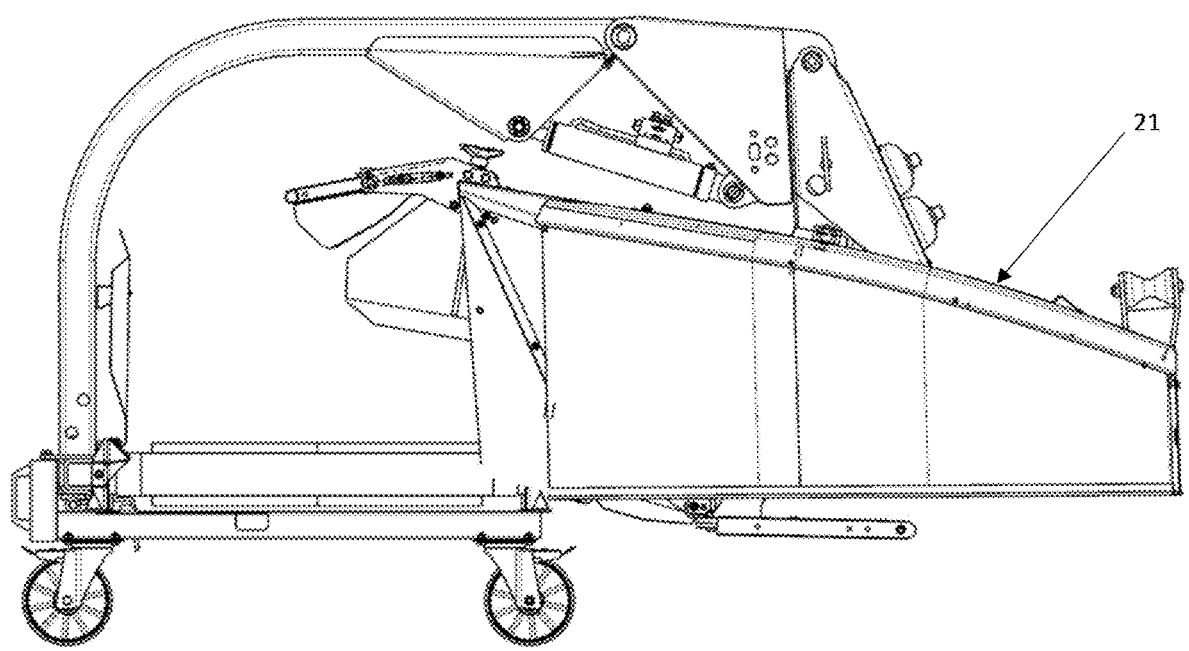
FIG. 12 shows a side view of a belt conveyor according to the invention, as attached to a mower unit of an agricultural machine.

FIGS. 10 to 12 illustrate a third exemplary embodiment wherein the first part 12 of the coupling mechanism at the crop conveyor features a hooked structure 65 for engagement with a supporting element, e.g. in the form of a cross bar 66, at the mounting structure 10 serving as the second part 11 of the coupling mechanism. Other parts of the crop conveyor are analogous to earlier embodiments, including hydraulic connections to power the hydraulic actuator 63 and/or the conveyor itself. Likewise, electrical communication enables detection and monitoring of the crop conveyor by a control system of the agricultural machine.

FIGS. 10(*a*) and 10(*b*) respectively show side views of the apparatus in a decoupled state and during coupling/decoupling. The crop conveyor 15 features a unitary support arm 13 that extends from a proximal end connected with the conveyor, curved toward to a distal end associated with the coupling mechanism 12. For positioning during the coupling operation, wheels 14 provide manoeuvrability, either as part of a separate trolley or as separable/retractable components.

The coupling process is shown in FIGS. 11(*a*) to 11(*c*). According to FIG. 11(*a*) the gendered element 12 associated with the conveyor is moved (e.g. by trolley) to a position against and above mounting structure 10. Partial alignment/ registration can be provided by sloping walls 67/68 of the respective structures as they move together so that a pair of hooks 65 become positioned between two main struts 69 of the mounting structure 11. Once in approximate position, lifting of the mounting structure 10 (typically extending from a mowing unit) brings hooks 65 in contact with a mating surface of the mounting structure, e.g. cross bar 66. A taper 70 visible at the open mouth of the hooks 65 provides coupling guidance for the bar (male element) 66 into the main recess of a hook (female element) 65 until fully engaged according to FIG. 11(*b*). As shown, bar 66 may be a cylinder or any other shape compatible with the recess provided by hook 65. Indeed, hook 65 can be more broadly described as a receiving recess.

During engagement, i.e. as trolley 14 moves the first part 12 of the coupling mechanism against the second part 11, a lock ring flange 71 (e.g. a pair thereof) will move into a recess within each strut 69 to align with an opening 73 extending laterally therethrough. This movement not only provides for locking of the two parts together, e.g. by a lock pin 72 as shown in FIG. 11(*c*), but also a further guidance feature to ensure that hooks 65 are located at the correct position relative to bar 66 before the mounting structure 10 is raised, as operated from hydraulics of the agricultural machine.

Wheels 14 can be removed/retracted once the coupling mechanism is secured, e.g. by lock pin 72, which may itself have a locking pin therethrough to retain it within openings 73. It will be apparent that the major load bearing components are the coupling mechanism, i.e. the hooks 66 as engaged with the bar 66.

The invention relates to a coupling mechanism for agricultural operating units such as, but not limited to, mower conditioners, plain mowers, conditioners, and conveyors in any combination thereof. The type of conveyor/swathing unit suitable for the described embodiments is most likely in the form of a belt conveyor, however, other means of conveyance are possible, such as an auger.

The invention claimed is:

1. A crop conveyor comprising a conveyor unit (15) and a coupling mechanism for coupling the conveyor unit (15) to a mounting structure (10) associated with an operating unit of an agricultural machine, the coupling mechanism comprising:
   a gendered element (12) in the form of a male element or a female element configured for receiving a complementary gendered element (11) during engagement, wherein the gendered element (12) is attached to the conveyor unit (15) by a unitary supporting arm (13) and is engageable with the complementary gendered element (11) attached to the mounting structure (10);
   wherein said gendered element (12) is upwardly or downwardly tapered for facilitating self-guiding of the gendered element (12) into engagement with the complementary gendered element (11) by, in use, upward movement of the mounting structure (10) in relation to the conveyor unit (15); and
   further comprising a hydraulic actuator (63) pivotally mounted and spanning between the coupling mechanism and the unitary supporting arm (13) for, in use, raising and lowering the conveyor unit (15) relative to the operating unit.

2. The crop conveyor according to claim 1 wherein the gendered element (12) is a female element mounted from the unitary supporting arm (13) and the complementary gendered element (11) is a male element mounted on the mounting structure (10).

3. The crop conveyor according to claim 1 wherein the engaged gendered elements (11, 12) are secured by a fastening means.

4. The crop conveyor according to claim 3 wherein the fastening means is in the form of a bolt or pin for location through an apertured flange associated with the gendered element, complimentary gendered element and/or mounting structure.

5. The crop conveyor according to claim 4 wherein the gendered element and apertured flange extend from a common side of the coupling mechanism, the apertured flange being receivable by a recess in the mounting structure, and wherein an aperture of the aperture flange is alignable with an opening extending laterally through the mounting structure.

6. The crop conveyor according to claim 1 wherein the gendered element (12) is of a hook, A, V, semi-circle, semi-hexagon or triangle shape or truncated form thereof, and the complementary gendered element (11) is of a complementary shape to be received by the gendered element (12).

7. The crop conveyor according to claim 1 wherein the gendered element (12) is a receiving recess (65) having a tapered opening (70) for guiding the complimentary gendered element thereinto the receiving recess.

8. The crop conveyor according to claim 1, wherein the conveyor unit is a belt conveyor.

9. The crop conveyor according to claim 1, including a hydraulic and/or electrical line or lines connection or multi-connection between the mounting structure and the conveyor unit.

10. The crop conveyor according to claim 9, wherein there is an electrical line connection, configured for communicating with the operating unit and/or agricultural machine for the purposes of detecting attachment of the crop conveyor.

11. The crop conveyor according claim 1, further including wheels and/or in combination with a wheeled trolley.

12. An agricultural apparatus for mounting on a carrier vehicle comprising a carrier arm on which is mounted an operating unit comprising the mounting structure and the mounting structure is couplable to the crop conveyor of claim 1 by engaging the gendered elements (11, 12).

13. The agricultural apparatus according to claim 12 wherein the mounting structure is adjoined to a suspension system of a telescopic carrier arm extending from the agricultural machine.

14. An agricultural machine for use with an operating unit and crop conveyor according to claim 1, including a control system for detecting the attachment of the crop conveyor and providing a visual indication to an operator thereof.

15. A method of coupling a crop conveyor to a mounting structure associated with an operating unit of an agricultural machine, wherein a conveyor unit of the crop conveyor is attached by a unitary support arm to one part of a two-part coupling mechanism and the mounting structure includes the other part of the two-part coupling mechanism and the coupling mechanism further comprises a hydraulic actuator (63), pivotally mounted and spanning between the coupling mechanism and the unitary supporting arm (13), for, in use, raising and lowering the conveyor unit (15) relative to the operating unit, including the following steps:
   (b) maneuvering the crop conveyor, via ground contacting wheels, to align a tapered opening of one part of the two-part coupling mechanism above the other part of the two-part coupling mechanism;
   (c) moving the mounting structure upwards so that the two parts of the two-part coupling mechanism move into an engaged position;
   (d) fastening the two parts securely in the engaged position by fastening means;
   (e) optionally connecting hydraulic and/or electric lines between the conveyor unit and the mounting structure or its associated operating unit by mechanically locking and sealing the facing surfaces of the connectable ends.

16. A method of decoupling a crop conveyor from a mounting structure, by reversing the steps according to claim 15.

* * * * *